US007382415B2

(12) United States Patent
Kiyama et al.

(10) Patent No.: US 7,382,415 B2
(45) Date of Patent: Jun. 3, 2008

(54) COLOR CORRECTION PROCESSING CIRCUIT BY EACH HUE

(75) Inventors: Shuji Kiyama, Kanagawa (JP); Masayuki Bannai, Kanagawa (JP); Masakazu Fukuchi, Kanagawa (JP); Junichi Onodera, Kanagawa (JP)

(73) Assignee: Fujitsu General Limited, Kanagawa-Ken (JP)

( * ) Notice: Subject to any disclaimer, the term of this patent is extended or adjusted under 35 U.S.C. 154(b) by 525 days.

(21) Appl. No.: 10/985,958

(22) Filed: Nov. 12, 2004

(65) Prior Publication Data
US 2005/0104895 A1    May 19, 2005

(30) Foreign Application Priority Data
Nov. 14, 2003 (JP) ............................ 2003-384601

(51) Int. Cl.
H04N 9/73 (2006.01)
H04N 9/64 (2006.01)
G09G 5/02 (2006.01)
G03F 3/08 (2006.01)
G06K 9/00 (2006.01)

(52) U.S. Cl. .................. 348/655; 348/649; 348/651; 348/703; 345/591; 345/600; 345/E9.04; 358/520; 382/167

(58) Field of Classification Search .............. 348/649, 348/651, 655, 703; 345/589, 591, 600; 358/520; 382/167
See application file for complete search history.

(56) References Cited

U.S. PATENT DOCUMENTS

| 1,529,125 | A | * | 3/1925 | Goodwin .................. 434/104 |
| 5,452,018 | A | * | 9/1995 | Capitant et al. ............ 348/651 |
| 5,999,230 | A | * | 12/1999 | Tanabe ..................... 348/649 |
| 6,424,374 | B2 | * | 7/2002 | Itakura .................... 348/222.1 |
| 6,614,488 | B1 | * | 9/2003 | Yamauchi et al. .......... 348/649 |
| 6,621,497 | B1 | * | 9/2003 | Sugiura et al. ............ 345/600 |
| 7,180,524 | B1 | * | 2/2007 | Axelrod ................... 345/593 |
| 2003/0227465 | A1 | * | 12/2003 | Morgan et al. ............ 345/589 |
| 2006/0170698 | A1 | * | 8/2006 | Morgan et al. ............ 345/589 |

* cited by examiner

Primary Examiner—Brian P Yenke
(74) Attorney, Agent, or Firm—McDermott Will & Emery LLP

(57) ABSTRACT

The object of the present invention is to provide a color correction process designed for enabling all the hues in the image properly corrected without leaving any uncorrected range; the inputted image data represented by the combination of 3 color signals is divided into a plurality of ranges by the hue so that color correction can be made by the range of each hue; in the color correction processing circuit by each hue, in order for the peripheral area of the range set for color correction to be prevented from being left uncorrected, the color correction process is designed so that correction ranges peripherally overlap with one another.

4 Claims, 3 Drawing Sheets

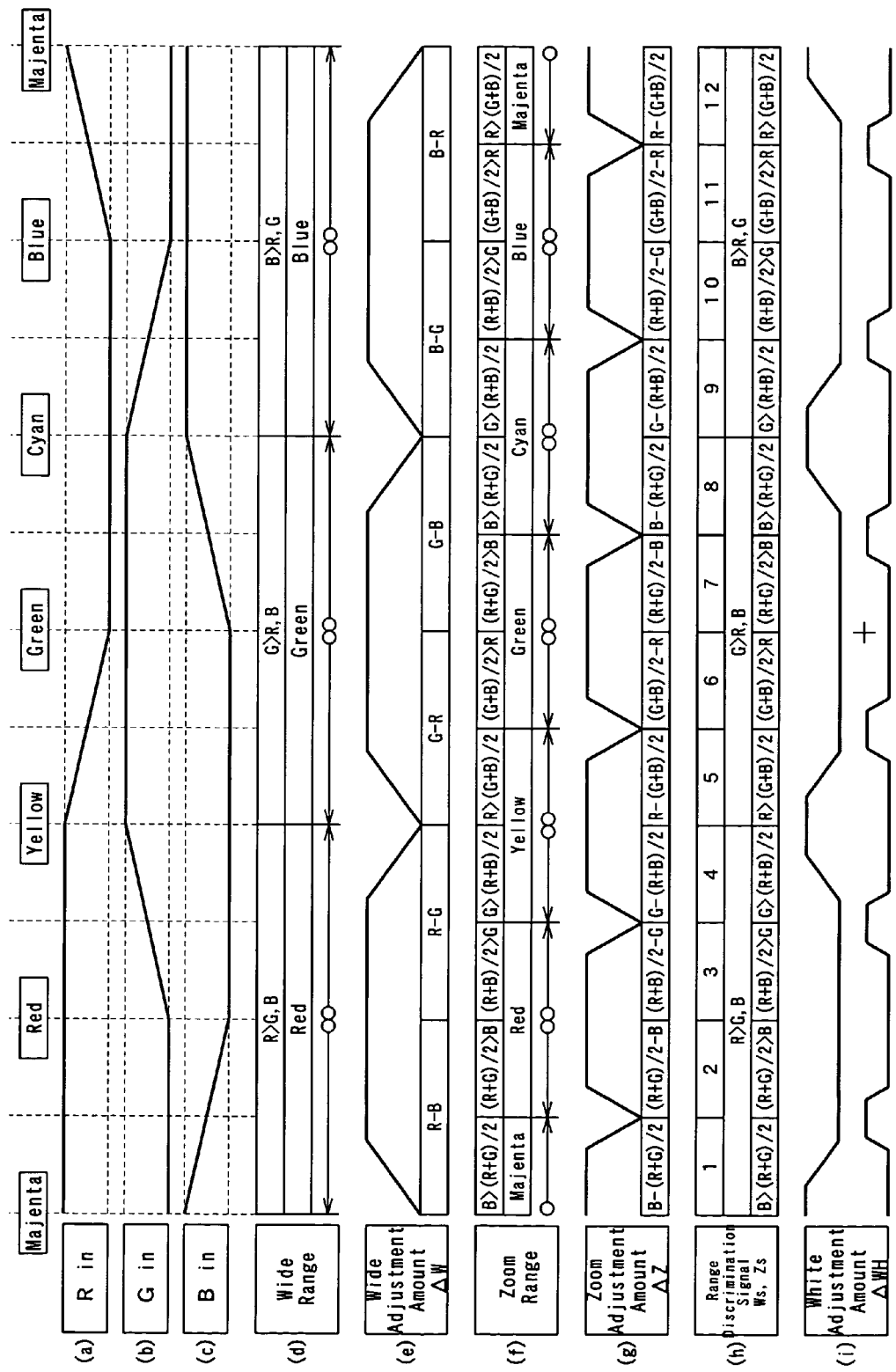

COLOR CORRECTION PROCESSING CIRCUIT BY EACH HUE

BACKGROUND OF THE INVENTION

1. Technical Field

The present invention relates to a data processing applicable to the display devices, such as the television sets and the monitors, as well as the image processing devices for creating the images of the computer graphics, more particularly to a color correction processing circuit designed to be capable of correcting the colors of the image data based on the 3 colors, i.e., the red color, the green color and the blue color, in consideration of the difference in the system of various image processing devices.

2. Background Art

Conventionally, in displaying the color according to the inputted color signal on a display device such as a monitor screen, it has been a common practice to adjust the color tone depending on the operating conditions of the display devices so that the image having the desired color can be reproduced. The color tone adjusting process can be divided broadly into the 2 processes, namely the table conversion process and the matrix operation process.

According to the table conversion process, the image data corresponding to the red color, the green color and the blue color (hereinafter referred to as R, G and B respectively) are inputted so that the optimal image data selected out of the image data for R, G and B, which have undergone the color tone adjustment process and stored in the memory such as a ROM or the like, can be outputted responding to the inputted image data; the table conversion method permits to adopt any color tone adjusting characteristic and thus is advantageous in realizing the color tone adjustment for good color reproduction. This conventional process, however, has a problem such that the process, which is designed simply for storing the data for each combination of the image data, requires a memory of a large capacity as large as about 400 M bits, and the similar problems still occurs even when the memory capacity is compressed to a certain extent; thus, it is difficult to permit the application of the LSI to such a process, and such process has another problem that the system of the process is not sufficiently elastic to the alteration of the operating conditions or the like.

In contrast, the color tone adjusting process employing the matrix operation method is designed so that the color tone adjusting values (amounts) to be outputted are calculated directly on the bases of the luminance signals and the color difference signals, Y, Cr and Cb, converted from the inputted R, G and B signals, or the originally inputted R, G and B signals. For instance, there is an operation method for obtaining the output signals, R', G' and B', by multiplying the inputted R, G and B signals by the matrix coefficients arranged in 3 rows and 3 columns. This operation formula can be expressed as given hereunder.

$$\begin{bmatrix} R' \\ G' \\ B' \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} R \\ G \\ B \end{bmatrix} \quad (1)$$

This color tone adjusting process by using the matrix operation method does not require the large-capacity memory, which has been discussed previously in connection with the table conversion process, and thus permits the application of the LSI. Further, (the color tone adjusting process) can be adapted flexibly to the alteration of the operating conditions by properly adjusting each of the elements $a_{11}$-$a_{33}$ of the coefficients of the matrix given in the above equation (1). As the color tone adjusting process by using the matrix operation method, there are the following references, i.e., the Reference 1 or the Reference 2.

Patent Reference 1: Laid-Open Patent Application No.2003-111091

Patent Reference 2: Laid-Open Patent Application No.2001-223911

In the conventional color tone adjusting process by using the matrix operation method, the hue made available by the combination of the inputted R, G and B signals is determined to calculate the amount of adjustment required for the hue to be adjusted. For instance, as shown in FIG. 3, (in the case of the conventional color correction process,) the given color is divided into the 6 color ranges, namely the red range, the green range, the cyan range, the blue range, the magenta range, for the fine correction of the colors; however, such a conventional color correction method is not good enough because of that the peripheral area of each color range is left almost uncorrected as being uncorrectable range.

Besides, there have been the conventional circuit designed for the color tone adjustment and the white balance adjustment in parallel; however, in the case of such a conventional color tone adjustment circuit, the white balance adjustment is made by adjusting the gains of the R, G and B, and it is known that using such a conventional circuit for the white balance adjustment results in the deterioration of other colors. Further, both in the case of the previously mentioned color correction process and in the case of the white balance adjustment process, the final adjustment has to be made by the user who is supposed to determine the degree of the necessary corrections while watching the condition of the image on the display screen; however; such conventional circuit is not designed to permit each user to make necessary adjustment while observing the condition of the image displayed on the screen before adjustment, so that the user is unable to make the fine settings for adjustment.

The present invention is proposed for resolving such problem of the conventional color correction process by providing a color correction processing circuit for each hue designed not only for enabling the user to make appropriate color correction for each of the hues in any given image without leaving any uncorrected ranges but also for enabling the white balance adjustment to be made without sacrificing other colors, as well as for enabling the user to make desired color correction by each hue while watching the condition of the image before correction.

SUMMARY OF THE INVENTION

Disclosure of the Invention

The invention described in claim 1 relates to a color correction processing circuit by each hue designed so that the inputted image data representing the combination of 3 different color signals are set to correspond to a plurality of ranges representing different hues for enabling the color to be corrected by the hue of each range; the circuit is designed so that the peripheral area of one correction range is set to overlap the peripheral area of adjacent correction range so as to prevent any range from being left uncorrected.

The invention described in claim 2 relates to the color correction processing circuit by each hue is designed for correcting the inputted image data represented by the combination of the 3 color signals by applying the matrix process by means of the matrix processor; the circuit comprises a first range discrimination and adjusting amount calculator, as being the first (color) correction means, designed to divide the given hue into at least 3 parts with respect to said inputted color signal thereby to calculate the discrimination signal Ws and the adjustment amount ΔW of the given hue range, a second range discriminating and adjustment amount calculator, as being the second (color) correction means, designed to calculate the discrimination signal Zs for discriminating the hue range and to calculate the adjustment amount ΔZ to discriminate the hue by dividing the hue more finely than does the first correction means, a first correction coefficient selector for selecting the correction coefficient Wt on the basis of the Ws signal, a second correction coefficient selector for selecting the correction coefficient Zt on the basis of the Zs signal, a first multiplication circuit for outputting ΔWt signal reflecting the amount of correction made by the first correction means, a second multiplication circuit for outputting ΔZt signal reflecting the amount of correction made by the second correction means by multiplying the ΔZ signal by Zt signal, and an addition circuit for generating the matrix coefficients by sequentially adding the ΔWt signal, Δzt signal and the ST signal, as being the statistic coefficient; the matrix coefficient operator is characterized by that the matrix coefficient operators are provided independently from one another and corresponding to the number of the elements of the matrix, and the matrix processing is made on the basis of each of the matrix coefficients generated by such a plurality of the matrix coefficient operator.

The invention described in claim 3, in addition to the invention described in claim 2, relates to the color correction processing circuit by each hue; the circuit comprises a matrix coefficient arithmetic unit, a matrix coefficient arithmetic unit designed to operate with the diagonally arranged terms of the matrix and provided with a white adjustment amount calculator for calculating the white adjustment amount ΔWH on the bases of the adjustment amount ΔW determined by the first correction means and the adjustment amount ΔZ determined by the second correction means, a third multiplication circuit for outputting the ΔWHt signal reflecting white adjustment amount obtained by multiplying the adjustment amount ΔWH signal by correction coefficient for white and an addition circuit for sequentially adding the ΔWt signal, the ΔZt signal and the ST signal, as being a static coefficient; the circuit is characterized by that the matrix coefficient is generated by further adding the ΔWHt signal too.

The invention described in claim 4, in addition to the invention described in claim 2 or claim 3, relates to a color correction processing circuit by each hue characterized by that the AND circuit is provided before each stage wherein the output of each adjustment amount signal is inputted to each multiplication circuit, that the display screen is divided as desired on the bases of the Vsync signal, as being the vertical synchronizing signal, and the blank signal, as being the display mute signal and that a half display screen processor is provided so that various correction amount signals for only one of the divided areas are outputted to the multiplication circuit from the AND circuit.

The invention described in claim 4, in addition to the invention described in claim 3, relates to the color correction processing circuit by each hue characterized by that a limiter is provided for limiting the amount of adjustment calculated by each of the first area discrimination and adjustment amount calculator, the second area discrimination and adjustment amount calculator and the white adjustment amount calculator so that the adjustment amount ranging from the low luminance to the high luminance can be maintained at substantially equal level.

According to the invention described in claim 1, each hue is divided so that the area not corrected by one correction means can be corrected by another correction means to correct the whole area so that all the hues in a given image can be corrected properly.

According to the invention described in claim 2, the matrix coefficient is generated on the bases of the ΔWt signal reflecting the correction amount according to the basic correction mode and the ΔZt signal reflecting the correction amount according to the compensation and correction mode so that the correction can be made without leaving any uncorrected areas at all to enable each hue to be corrected properly in any given image.

According to the invention described in claim 3, the matrix coefficient arithmetic unit for operating with the diagonally arranged terms is designed to generate the matrix coefficient including the ΔHt signal reflecting the white correction amount, so that only the white balance can be adjusted without sacrificing other colors unlike the case of the conventional white balance adjustment processing characterized by adjusting only the gains of R, G and B.

According to the invention described in claim 4, the image to be displayed is divided as desired and the color correction can be made for any one area, whereby, for example, the user is permitted to correct only one part of the divided image, if divided into two parts, leaving another parts intact, so that the user is able to adjust the image finely while comparing with the condition of uncorrected the other half of the image.

According to the invention described in claim 4, a limiter is provided so that the difference in the amount of the adjustment ranging from the low luminance to the high luminance can be maintained at substantially equal level with respect to the amounts of the adjustment respectively calculated by the basic correction mode range discrimination and adjustment amount calculator, the compensation and correction mode range discrimination and adjustment amount calculator and the white adjustment amount calculator.

BRIEF DESCRIPTION OF THE DRAWINGS

FIG. 4 is a schematic diagram illustrating the operation formulas and waveforms to be used for the calculation of each part in the color correction processing circuit by each hue shown in FIG. 1.

BEST MODE FOR CARRYING OUT THE INVENTION

Figure 2:
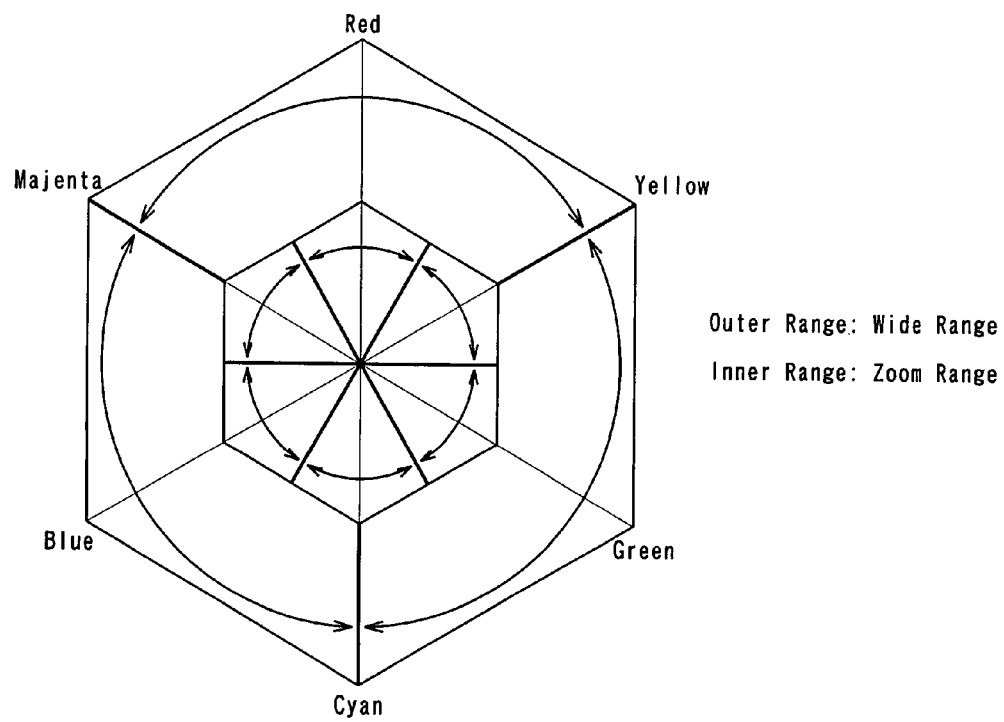
FIG. 2 is a schematic diagram illustrating correction ranges by the wide mode and the zoom mode characterizing the color correction processing according to the present invention.
Figure 3:
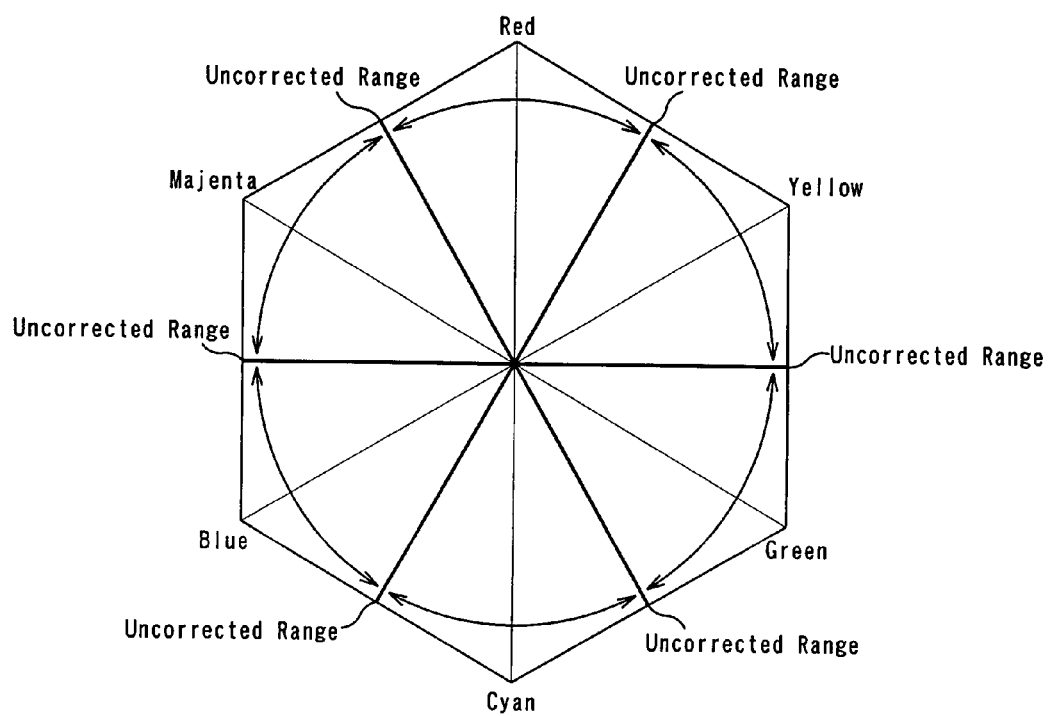
FIG. 3 is a schematic diagram illustrating the conventional color correction process by dividing the hue into 6 parts.

In order to resolve the problem of the conventional color correction process such that some of the ranges of the color are left uncorrected, the present invention is designed so that the color correction is made by using the 2 processes, namely the wide mode correction means, as being the basic correction mode, characterized by that the whole hue is divided in 3 ranges, i.e., the red range, green range and blue range, as is shown as being the outer range in FIG. 2, and the zoom mode, as being the compensative correction mode, characterized by that the whole hue range, represented by the inner range in FIG. 2, is divided into 6 parts, namely the red range, yellow range, green range, cyan range, blue range and magenta range, for correction so that the uncorrected range occurring in the peripheral area of the range during the correction process in one of the two correction modes can be corrected by the correction process in another correction mode. Further, the present invention is designed so that only the white color can be corrected without sacrificing other colors unlike the case of the conventional color correction process wherein the R, G and B gains are uniformly adjusted for the adjustment of the white balance. Furthermore, according to the present invention, the image can be divided into 2 parts so that the user is permitted to compare the effect of the correction applied to one part of the image with the condition of the uncorrected part of the image. The embodiments of the present invention will be described hereunder referring to the pertinent drawings.

In the description of the following embodiment, the basic correction mode is described as the wide mode, while the compensative correction mode will be described as the zoom mode.

Figure 1:
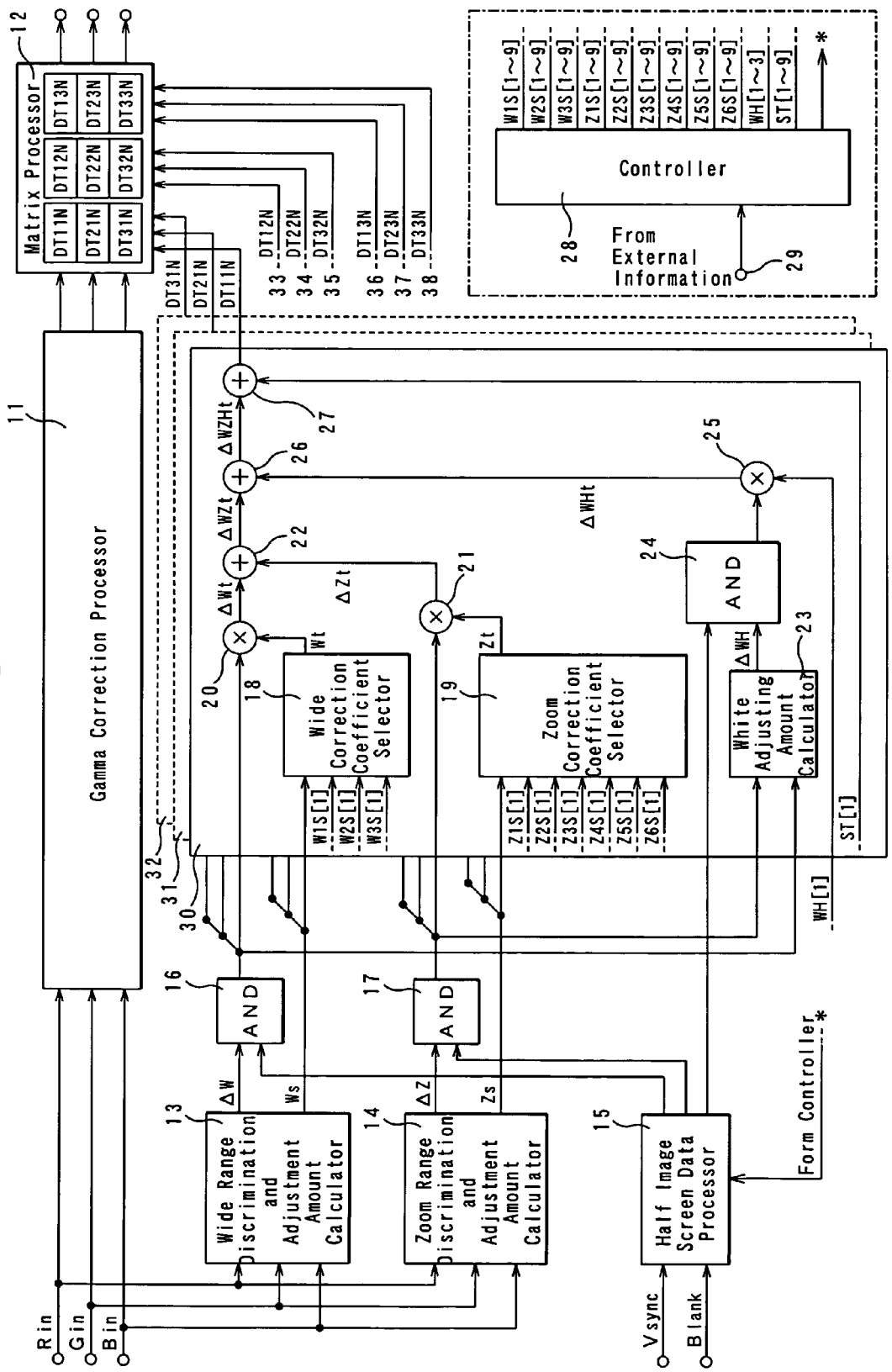
FIG. 1 is a block diagram illustrating the composition of the color correction processing circuit by each hue according to the present invention.

FIG. 1 is a block diagram illustrating the composition of the color correction processing circuit by each hue according to the present invention. As shown in FIG. 1, the red color component, the green color component and the blue color component of the video signal (corresponding to R in, G in and B in in FIG. 1), as being the signals representing 3 colors, are inputted to the gamma correction processor 11, as well as to the wide range discrimination and adjustment amount calculator 13 and the zoom range discrimination and adjustment amount calculator 14. The output of the gamma processor 11 is inputted to the matrix processor 12 to undergo the color correction process by using the matrix coefficients arranged in 3 rows×3 columns such as one in the case of the previously mentioned Equation (1) and then outputted from the output terminal. In this case, the 9 matrix coefficients, that is, the matrix coefficients corresponding to the matrix of 3 rows×3 columns, are calculated by the matrix coefficient calculators, 30 through 38, respectively as being DT11N, DT21N, DT31N, DT12N, DT22N, DT32N, DT13N, DT23N and DT33N. The process for obtaining the DT11N by the matrix calculator 30 will be described in the following.

The wide range discrimination and adjustment amount calculator 13 determines whether the combination of the inputted R, G and B signals corresponds to which of the 3 ranges, namely the red range, green range and blue range, in the wide mode, as being the basic mode, and outputs Ws, as being the discriminating signal, to the wide correction coefficient selector 18 of the matrix coefficient calculator 30 and also calculates the wide mode adjustment amount ΔW for output to the multiplication circuit 20 of the matrix coefficient calculator 30 through the AND circuit 16.

The zoom range discrimination and adjustment amount calculator 14 determines whether the combination of the inputted R, G and B signals corresponds to which of the 6 ranges, i.e., the red range, yellow range, green range, cyan range, blue range and magenta range in the zoom mode, as being the compensative correction mode; the wide range discrimination and adjustment amount calculator not only outputs Zs, as being discrimination signal, to the zoom correction coefficient selector 19 of the matrix coefficient operation unit 30 but also calculates the adjustment amount ΔZ in the zoom mode for output to the multiplication circuit 21 of the matrix coefficient arithmetic unit 30 through the AND circuit 17.

The half image screen data processor 15 is subject to the input of the V sync signal, as being the vertically synchronizing signal for input, the input of the blank signal, as being the display mute signal, and the input of the signal for instructing the half image data processing from the controller 28. The controller 18 outputs the signal for instructing the data processing for the half image to the half image data processor in response to the instruction from the user; in response to the instruction for the half image data processing, the half image data processor 15 detects the designated position to be processed in the image on the bases of the V sync signal and the blank signal and outputs the high-level signal for the portion of the image to be corrected and the low-level signal for the portion not requiring the correction respectively to the AND circuits 16, 17 and 24. The AND circuits 16, 17 and 24 are respectively designed to output the inputted signal to the subsequent stage only when the signal from the half image data processor is the high-level signal.

The wide mode correction coefficient selector 18 of the matrix coefficient arithmetic unit 30 selects the wide mode correction coefficient on the basis of the Ws signal from the wide mode range discrimination and adjustment amount calculator 13 for output, as being the Wt signal, to the multiplication circuit 20 in the subsequent stage. In this stage, the wide correction coefficient selector 18 is subject to the inputs of the correction coefficients, i.e., W1S [1], W2S [1] and W3S [1] signals, as being the correction coefficients corresponding to each of the hues in the wide mode, from the controller 28, and the correction coefficient corresponding to the discrimination by the discrimination signal Ws is selected from among these signals. Further, the controller 28 is subject to the inputs of the adjustment items, such as the hue, saturation, the gains of R, G and B or the like, which have been set by the user by the personal computer or the like, from the external information input terminal 29, and the correction coefficient for each hue is generated based on such inputs.

The multiplication circuit 20 multiplies the ΔW signal, representing the adjusting amount inputted from the wide mode range discrimination and adjustment amount calculator 13 through the AND circuit 16, by the Wt signal, inputted as being the adjusting coefficient inputted from the wide mode correction coefficient selector 18, to generate the ΔWt signal be outputted to the addition circuit 22 in the subsequent stage.

The zoom correction coefficient selector 19 of the matrix coefficient arithmetic unit 30 selects the zoom mode correction coefficient on the basis of the Zs signal from the zoom range discrimination and adjusting amount calculator 14; the selected zoom mode correction coefficient is outputted, as being the Zt signal, to the multiplication circuit 21 in subsequent stage. In this stage, the correction coefficients, Z1S [1], Z2S [1], Z3S [1], Z4S [1], Z5S [1] and Z6S [1] signals corresponding respectively to different zoom mode hues inputted from the controller 28, are inputted to the zoom mode correction coefficient selector 19, and the correction coefficient corresponding to the hue discriminated by the discrimination signal Zs is selected from among these signals. These 6 possible correction coefficients are generated in the controller 18 corresponding to the various hues based on the information from the external information input terminal 29 in similarly fashion to that in the case of the wide mode.

In the multiplication circuit 21, the ΔZ signal, representing the adjusting amount inputted from the zoom mode range discrimination and adjusting amount calculator 14 through the AND circuit 14, is multiplied by the Zt signal, as being the correction coefficient inputted from the zoom mode correction coefficient selector 19, to generate the ΔZt signal for output to the addition circuit 22 in the subsequent stage.

In the white adjusting amount calculator 23, the ΔW signal, representing the adjusting amount inputted from the wide mode range discrimination and adjusting amount calculator 13 through the AND circuit 16, and the ΔZ signal, representing the adjusting amount inputted from the zoom mode range discrimination and adjusting amount calculator 14 through the AND circuit 17, are used to generate the ΔWH signal, representing the white adjusting amount, for output to the AND circuit 24 in the subsequent stage. In the AND circuit 24, only when the signal from the half image processor 15 is at high level, the ΔWH signal is outputted to the multiplication circuit 25 in the subsequent stage.

In the multiplication circuit 25, the ΔWH signal, inputted from the white adjusting amount calculator 23 through the AND circuit 24, is multiplied by the WH [1] signal, as being the correction coefficient to be used for the correction of the white signal from the controller 28, for generating the ΔWHt signal for output to the addition circuit 26 in the subsequent stage. The WH [1] signal, as being the correction coefficient to be used for the white correction, is a signal to be inputted for only the diagonally arranged terms of the 3×3 matrix coefficients, and is intended to adjust the white balance by making the fine adjustment of the diagonally arranged terms primarily having the value of [1].

In the addition circuit 22, the ΔWt signal from the multiplication circuit 20 is added to the ΔZt signal from the multiplication circuit 21 to generate the ΔWZt signal for output to the addition circuit 26 in the subsequent stage; in the addition circuit 26, the ΔWZt signal is added to the ΔWHt signal from the multiplication circuit 25 to generate the ΔWZHt signal for output to the addition circuit 27 in the subsequent stage; in the addition circuit 27, the ΔWZt signal is added to the ST [1] signal, as being the static coefficient from the controller 28, to generate the DT11N signal, as being a matrix coefficient, for output to the matrix processor 12 in the subsequent stage.

When the DT11N signal is generated in the matrix coefficient arithmetic unit 30, simultaneously, the matrix coefficients are also generated in other matrix coefficients arithmetic units, 31 through 38, for output to the matrix processor 12 in the subsequent stage; in the matrix processor 12, the matrix processing is applied to the output from the gamma correction processor 11 by using these 9 matrix coefficients, and the result of the matrix processing is outputted. However, since the system for calculating the white adjustment amount in the matrix coefficient arithmetic unit 30 is applicable only to the diagonally arranged terms in the 3×3 matrix, the matrix arithmetic units 34 and 38 generate the DT22N and DT33N respectively reflecting the white adjustment, while other matrix coefficient arithmetic units generate the matrix coefficient not designed for the white adjustment.

The effect of such composition of the system will be described referring to FIG. 1 and FIG. 4. The R in, G in and B in signals respectively inputted to the color correction processing circuit by the hue have the hue values as are shown respectively in FIG. 4(a) through (c), and these signals are inputted to the wide mode range discrimination and adjusting amount calculator 13 and the zoom mode range discrimination and adjusting amount calculator 14.

In the wide mode range discrimination and adjusting amount calculator 13, the conditional expressions, shown in FIG. 4(d) through (h), are applied to the inputted R in, G in and B in signals for the discrimination of the ranges, while the wide mode adjusting amount ΔW is calculated by using the conditional expression given in FIG. 4(d). In this case, when the ΔW is obtained by using the expression given in FIG. 4(e), a triangular pulse, differing from the one given in the diagram, is generated but is corrected to the trapezoidal waveform shown in the same diagram by applying the limiter to such triangular pulse. More specifically, when the maximum luminance level is assumed to be 255, the limiter is applied at the point where the luminance level is 32 or so, thereby keeping the portion corresponding to the value of the luminance higher than this level to a constant value. In this way, by applying the limiter the difference in the adjusting amount between the low luminance and the high luminance can be kept at a substantially constant level, whereby the color correction being free of the disagreement of the hues can be realized.

In the zoom mode range discrimination and adjustment amount calculation process 14, the conditional expressions, given in FIG. 4(f) through (h), are applied to the inputted R in, G in and B in signals to discriminate their ranges, while the expression, given in FIG. 4(g), is applied to obtain the zoom mode adjusting amount ΔZ by calculation. Similarly to the case for obtaining the wide mode adjusting amount ΔW, the waveform is corrected to the trapezoidal waveform as is shown in the diagram by applying the limiter.

In the white adjusting amount calculator 23, the white adjusting amount is calculated for output on the bases of the wide mode adjusting amount ΔW and the zoom mode adjusting amount ΔZ. More specifically, the waveform obtained by reversing the high level of the waveform of the signal ΔW shown in FIG. 4(e) is reversed for low level and whose highest value is limited by applying the limiter and the waveform obtained by reversing the high level of the signal ΔZ shown in FIG. 4(g) is reversed for low level and whose highest value is limited by applying the limiter are made available so that the waveform made available by adding these two waveforms as shown in FIG. 4(i) can be outputted as the white adjusting amount ΔWH.

In the wide mode correction coefficient selector 18, the correction coefficient selected by the Ws signal is multiplied by the wide mode adjusting amount ΔW to generate the ΔWt; in the zoom correction coefficient selector 19, the correction coefficient selected by the Zs signal is multiplied by the zoom mode adjusting amount ΔZ to generate the ΔZt; the white adjusting amount ΔWH is multiplied by the white correction coefficient to generate the signal ΔWHt; these there signals, namely ΔWt, ΔZt and ΔWHt, are sequentially added to generate DT11N, as being 1-row-1-column matrix coefficient, for output to the matrix processor 12 in the subsequent stage.

In this way, the color correction is made by using both the signal ΔWt reflecting the wide mode adjusting amount and the signal ΔZt reflecting the zoom mode adjusting amount, so that the peripheral area of the hue range left uncorrected in one mode can be corrected by the correction in the other mode thereby enabling the color correction to be made without leaving any uncorrected range. Further, for the white balance adjusting process, the ΔWht signal, reflecting white adjusting amount only on the diagonally arranged terms of the matrix coefficients, is generated for addition, so that the white balance adjustment not affecting other colors can be made possible, unlike the conventional white balance adjustment process designed for uniformly adjusting the R, G and B gains.

Further, in order for the color correction and the white balance adjustment according to the present invention to be made more effectively than by conventional process, the half image processor 15 is designed so that the given image can be divided into 2 parts by any desired boundary, so that the above-mentioned correction process is applied to one part of the image, while the other part of the given image is left intact by keeping the outputs from the AND circuits 16, 17 and 24 at 0 level according to the instruction from the half image processor 15 so that the half part of the image is left not being subject to the color correction and the white balance adjustment, and whereby the user is permitted to adjust only one half of the image so as to be able to compare the condition of the corrected half image with the uncorrected half image for enabling the user to correct the image as fine as possible.

The previous embodiment is designed so that the adjusting amounts are determined on the bases of the R, G and B, as being the input signals, and the adjusting amounts are determined on the bases of these 3 signals, but the present invention is not limited to such embodiment. For instance, the input signals may be the 3 signals such as for yellow (Y), cyan (C) magenta (M), so that the wide mode corrections can be made on the bases of the 3 ranges corresponding to Y, C and M. Therefore, even when the wide mode correction is made on the bases of the 3 ranges corresponding to the Y, C and M, the correction of the uncorrected ranges can be supplemented by the zoom mode correction and vice versa, so that effects of correction similar to that of the previous embodiment wherein the color is divided into the ranges of R, G and B can also be obtained.

Further, in the previous embodiment, the hue is divided into 3 ranges in the wide mode color correction, while the hue is divided into 6 ranges in the zoom mode color correction so that any uncorrected range can be supplemented by another correction range. However, the hue division method is not limited to the above-mentioned method; for instance, in the case of the wide correction mode, the hue may be divided into 6 ranges, while, in the case of the zoom correction mode, the hue may be divided into 12 ranges or any number of ranges as long as the color correction process is designed so that any uncorrected range can be supplemented by another range and so that the object of the present invention can be accomplished. Similarly, another embodiment may be designed so that the hue is divided into 3 ranges, i.e., R, G and B for the wide mode color correction, while the hue is divided into the 3 ranges, i.e., Y, C and M for the zoom mode color correction, whereby the color correction process can be designed so that any uncorrected range can be supplemented by another correction range to realize the color correction process not leaving any uncorrected range.

The invention claimed is:

1. A color correction processing circuit for correcting each hue of an image, arranged so that the color correction can be made by applying matrix processing via a matrix process to the input image data represented by the combination of the 3 color signals; said color correction processing circuit, comprising a basic correction mode range discrimination and adjusting amount calculator arranged to generate a discrimination signal Ws and for calculating the adjusting amount $\Delta W$ on the basis of the hue of each inputted color signal divided into at least into 3 ranges, a compensative correction mode range discrimination and adjusting amount calculator arranged to generate a hue range discrimination signal Zs and calculating the adjusting amount $\Delta Z$ in the compensative correction mode by dividing the hue of the input color signal more finely than that in the case of said basic correction mode, a basic correction mode correction coefficient selector for selecting the correction coefficient Wt on the basis of said Ws signal, a compensative correction mode correction coefficient selector for selecting a correction coefficient Zt on the basis of said Zs signal, a basic correction mode multiplication circuit for outputting the $\Delta Wt$ signal reflecting the correction amount in the basic correction mode by multiplying said $\Delta W$ signal by the Wt signal, a compensative correction mode multiplication circuit for outputting the $\Delta Zt$ signal reflecting the correction amount in the compensative correction mode obtained by multiplying said $\Delta W$ signal by the Wt signal, a matrix coefficient addition circuit for generating the matrix coefficient by sequentially adding said $\Delta Wt$ signal, $\Delta Zt$ signal and the ST signal, as being a static coefficient, thereby constituting a matrix coefficient arithmetic unit; said color correction processing circuit being characterized in that the matrix coefficient arithmetic units are provided independently and are as many in number as the number of the elements of the matrix, and the matrix processing is carried out on the bases of the various matrix coefficients generated by such plural matrix coefficient arithmetic units.

2. The color correction processing circuit according to claim 1, wherein, among said matrix coefficient arithmetic units, the matrix coefficient arithmetic unit for the diagonally arranged terms is provided with the white adjusting amount calculator for calculating the white adjusting amount $\Delta WH$ from the adjusting amount $\Delta W$ in the basic correction mode and the adjusting amount $\Delta Z$ in the compensative correction mode and a third multiplication circuit for generating the $\Delta WHt$ signal reflecting the white correction amount by multiplying said correction amount represented by the $\Delta WH$ signal by the white correction coefficient are provided; in said addition circuit for sequentially adding said $\Delta Wt$ signal, $\Delta Z$ signal and the ST signal, as being the static signal, are sequentially added, the $\Delta WH$ t signal is also added to generate the matrix coefficient.

3. A color correction processing circuit according to claim 1 or claim 2, wherein the AND circuit is provided before each multiplication circuit whereto the output of each adjusting amount signal is to be input;

the image displayed on the screen is divided by being separated as desired on the bases of the V sync signal, as being a vertical synchronizing signal, and the blank signal, as being the mute signal;

and comprising a half image data processor arranged to permit each adjusting amount signal to be outputted to the multiplication circuit for only one divided part of the image.

4. A color correction processing circuit according to claim 2, wherein each of the adjusting amounts to be calculated respectively by the basic correction mode range discrimination and adjusting amount calculator, the compensative correction mode range discrimination and adjusting amount calculator and the white adjusting amount calculator is limited by applying the limiter so that the difference in the adjusting amount ranging from the low luminance level to the high luminance level can be kept constant.

* * * * *